UNITED STATES PATENT OFFICE.

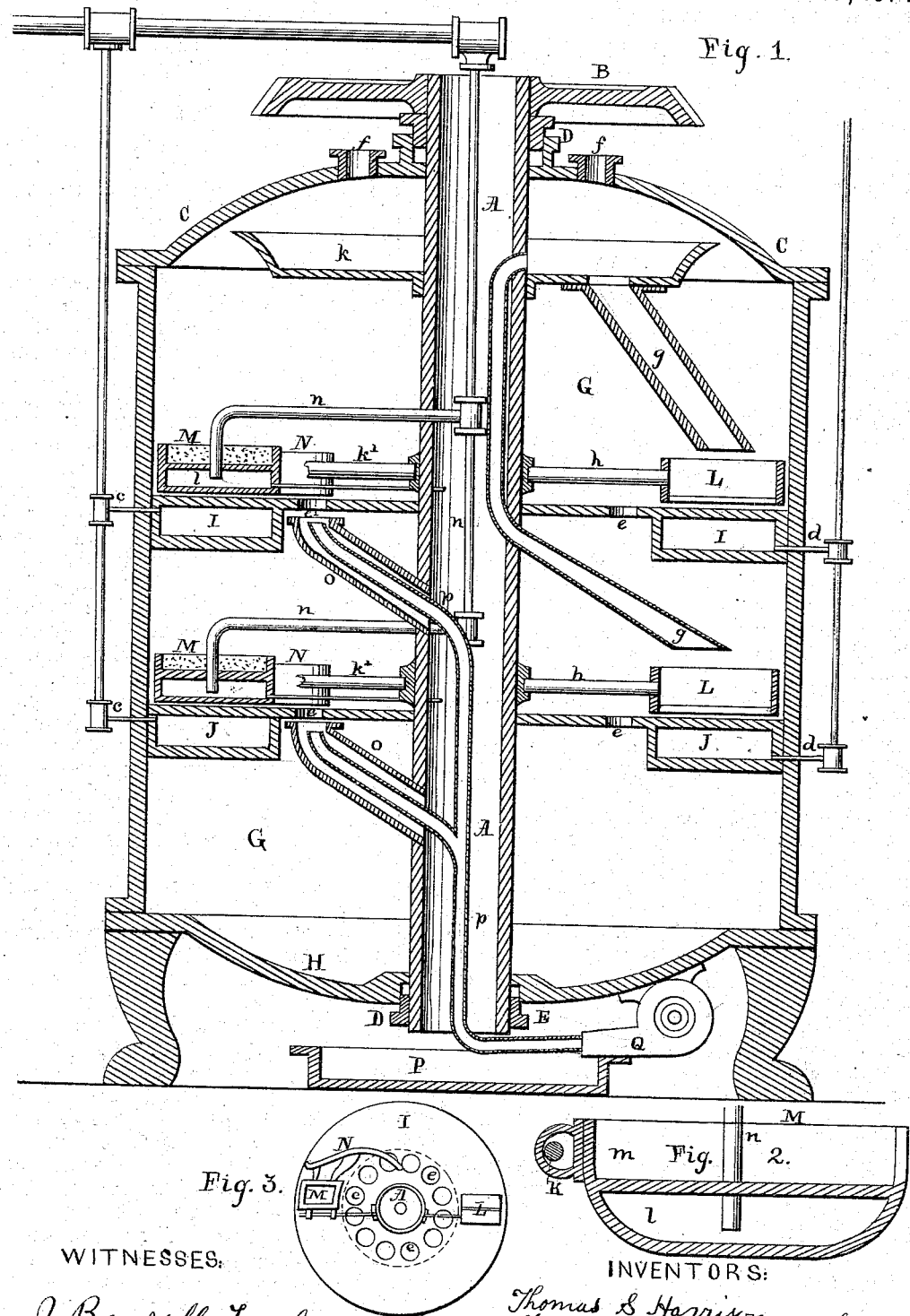

THOMAS S. HARRISON, OF PHILADELPHIA, PENNSYLVANIA, AND THOMAS H. SAVERY, OF WILMINGTON, DELAWARE.

IMPROVEMENT IN DRYING APPARATUS.

Specification forming part of Letters Patent No. 156,849, dated November 17, 1874; application filed September 23, 1874.

*To all whom it may concern:*

Be it known that we, THOMAS S. HARRISON, of Philadelphia, Pennsylvania, and T. H. SAVERY, of Wilmington, Delaware, have invented a new and useful Inclosed Automatic Drying Apparatus, for drying white lead, pulp, and semi-fluid material; and we do hereby declare the following to be a full, clear, and precise description of the same, reference being had to the accompanying drawings, which form part of this specification, and in which—

Figure 1 is a vertical section of our drier, taken through the center. Fig. 2 is a vertical side section of the sled; and Fig. 3, a sectional plan taken on the line $a\,b$, Fig. 1.

Similar letters of reference indicate corresponding parts in all the figures.

Our invention consists of a large inclosed metal cylinder containing one or more perforated steam-platforms, upon which the materiel to be dried is fed; of a central rotating shaft, carrying feeders laterally projecting therefrom to supply the material; also, steam-sleds to drag over it, and scrapers for scraping it through the apertures in the platforms; of a rotating receiving-pipe, projecting from the main shaft, inclosing a blast-pipe to force air from a blower through the material as it falls into the receiving-pipe, the whole forming a continuous automatic drying apparatus for drying white lead, pulp, or semi-fluid material. It also consists in the peculiar construction of certain portions and adjuncts of our apparatus, as hereinafter to be more fully described and explained.

To enable those skilled in the art to which our invention appertains to make and use our apparatus, we will proceed to describe its detailed construction.

G is the inclosing-case of the drier—a large metal cylinder placed upon legs or built up upon masonry or any suitable frame-work. It is provided with a cover-plate, C, bolted or secured in any convenient manner. It has also a base-plate, H, likewise secured to it. Directly around the axis of this inclosing-case is the main shaft A, passing through stuffing-boxes D and E at cover and base plates, free to rotate within them. It is hollow throughout, and is provided at its upper extremity with a bevel-gear, B, whence is imparted to it a motion of rapid or slow rotation, as may be desired. Dividing the inclosing-case into compartments are one or more platforms, I J, of peculiar construction. Around their outer periphery, and extending inwardly about the distance of one-half the radius, they are double, forming, so to speak, a hollow annulus around the inside of the casing. This is kept filled with steam or heated air by means of the inlet and outlet steam-pipes $c$ and $d$, arranged either externally or internally. The platforms continue to the main shaft single, and around the interior circumference of their double portion, and passing through the single portion, are a series of circular perforations, $e\,e$, as shown very clearly in Fig. 3. Through these apertures the material is scraped, of which more hereafter. Located at the top of the casing, and attached to the main shaft, is the box $k$, in which the material to be dried is supplied by spout or funnel, as desired, through a manhole, $f$, in the cover-plate. From this box $k$ leads a spout, $g$, conducting the material into the hopper L—an elongated funnel-shaped box of the exact width of the double portion of the platform, with an opening along its bottom, supported by an arm, $h$, radiating from the main shaft and attached to it.

It will be now seen how the material is thus gradually spread upon the platform over its heated portion. Attached by loose connections to a bracket, $k'$, radiating from and attached to the shaft, is the sled M, (shown in sections in Fig. 2,) made double and supplied in its lower compartment $l$ with steam from the pipe $n$, coming the main shaft, and filled in its upper part, $m$, with any non-conducting material. This sled is drawn over the material and completely flattens it, and by its large heated bearing-surface dries very effectively. Of sleds, we use one or more, as convenient. Obliquely attached to the rear of the sled is the scraper N, (shown in Fig. 3,) which sweeps the material directly into the apertures $e\,e$ in the platforms. Issuing out from the main shaft is the catcher O—a flaring tube so adjusted as to open immediately below the apertures in the platforms, and to just come beneath the scraper. It opens into the main shaft, and forms means of conduit for the falling material from the platform into the main shaft, through which it gravitates into the receiving-pan P. Located beneath the case is a blower, Q, whence a pipe, $p$, issues, passes up the shaft, and into and through the catcher. Through this pipe air is driven, of normal or heated temperature, and up through the descending current of material, as it falls through the apertures in the platform, thus aiding most materially in the process of drying.

We make our apparatus with two floors, as in the drawings, making it thus do double work, and causing it to be the most economical in the market; or we employ but one, or three, or four, as desired, the processes being continuous, automatic, and corresponding in them all. In dimensions, a width of ten feet for case and three feet for shaft, with a height of about ten feet, we find a convenient size.

Having thus fully described our invention, what we claim, and desire to secure by Letters Patent of the United States, is—

1. The inclosing-case G, with its half-double and perforated platforms L, in combination with the rotating hollow shaft A and its hopper L, sled M, scraper N, and catcher O, through which a pipe passes carrying air from a blowing apparatus, the whole forming an automatic continuous drier for white lead, pulp, or semi-fluid material, utilizing, in so doing, the combined effects of heat, pressure, and a blast of air, substantially as specified.

2. The combination of the rotating shaft A with the scraper N, carried by the sled M, attached to said shaft, and with the catcher O, operating as described, so that the scraper shall scrape the material through the apertures $e$ in the platform into the catcher continuously as both rotate with the main shaft, substantially as described.

3. The catcher O, opening into the main shaft A, in combination with the pipe $p$, blower Q, and main shaft A, constructed and operating as and for the purpose specified.

4. The sled M, consisting of double compartments $m$ and $l$, containing, respectively, non-conducting material and steam, in combination with the main shaft A and the pipes $n$, operating as specified.

5. An obliqued scraper, N, attached direct to the sled M, as specified.

6. The combination of the main rotating shaft A with the hopper L, the sled M, and its scraper N, the catcher O, and the blow-pipe $p$, operating as specified.

THOMAS S. HARRISON.
THOS. H. SAVERY.

Witnesses to signature of T. S. HARRISON:
J. BONSALL TAYLOR,
J. QUINN,
LISLE STOKES.

Witnesses to signature of T. H. SAVERY:
SAM. C. BIDDLE,
L. P. BUCK.